2,422,008

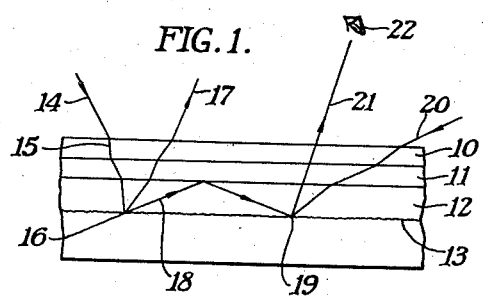
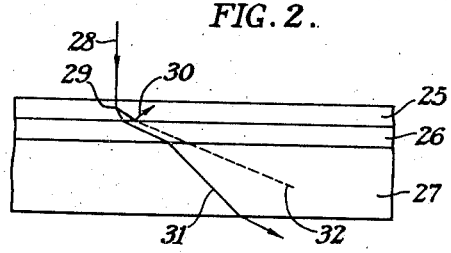
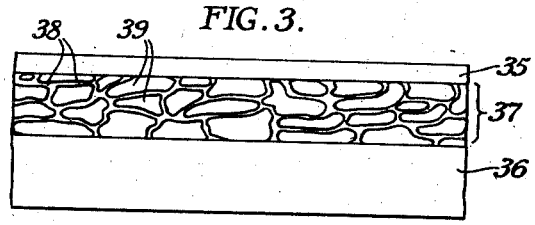
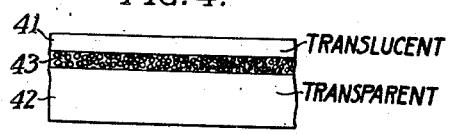
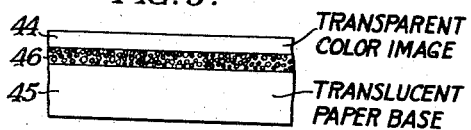
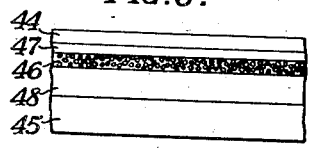
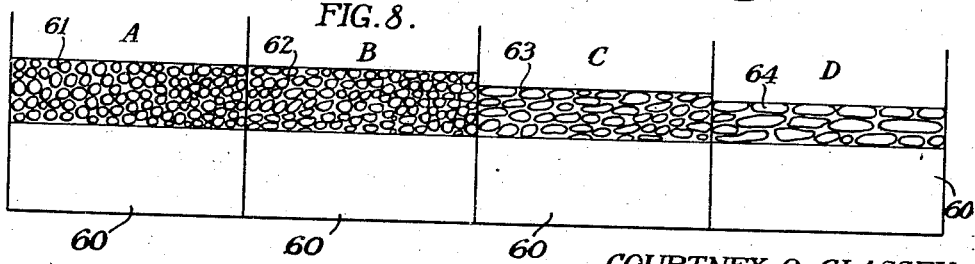
COURTNEY Q. GLASSEY
INVENTOR Patented June 10, 1947

UNITED STATES PATENT OFFICE 2,422,008

AIRSPACED PHOTOGRAPHIC SUPPORT

Courtney Q. Glassey, Rochester, N. Y., assignor to Eastman Kodak Company, Rochester, N. Y., a corporation of New Jersey Application January 6, 1945, Serial No. 571,591

6 Claims. (Cl. 95—8)

This invention relates to photographic film, particularly to supports. This is a continuation-in-part of Serial No. 493,397, filed July 3, 1943.

In copending applications Serial No. 576,230, Hanson and Evans, filed February 5, 1945, and Serial Nos. 571,661 and 571,662, Murray, filed concurrently herewith, the latter two now Patents 2,400,365 and 2,400,366, the advantages of an airspace in the support for color prints are fully described.

The object of the present invention is to provide an airspaced support.

The purpose of this continuation in part application is to include certain limitations as to the thickness of the airspace which are inherent in the invention and which distinguish over prior arrangements which actually have nothing to do with the present invention. For example U. S. Patent 315,703, Bencke et al., shows a picture layer airspaced from a diffusing layer in order to get a softened appearance due to halation which is exactly opposite to the purpose and effect of the present invention. In the Bencke arrangement, the separation of the picture layer and the diffusing layer is very large, many times the total thickness of ordinary photographic papers so that the scattered light reduces the detail contrast, the sharpness, and the color saturation of the picture giving a softened or "porcelain" appearance. Even in ordinary photographic prints in which the diffusing layer is attached to the picture layer, this effect is not present. For convenience the scattering of light in the Bencke et al. arrangement may be referred to as "primary halation" in which case it should be noted that the effect of "primary halation" in ordinary photographic prints is negligible since the spreading of light thereby is less than the minimum detail of the picture anyway.

However, in ordinary color prints, there is what may be termed "secondary halation" due to multiple internal reflections within the picture layer. This secondary or residual halation is removed by the present invention. The present invention would have no value in any arrangement having an objectionable degree of primary halation. If the separation of the picture and diffusing layers were made greater than 5/1000 of an inch, primary halation due to the Bencke effect would counteract the function of the present invention rendering it inoperative. Preferably this separation should be less than 1/1000 of an inch. Since the airspace must be equal to or less than this separation, these values also constitute the upper limits of the airspace thickness.

The airspace according to the present invention can have any thickness less than that just specified but of course there must be some airspace. Optical contact or even thicknesses less than one or two wave lengths of light introducing interference patterns would not allow the invention to operate properly, but mechanical contact at scattered points, as with a rough or textured surface would still permit the operation of the present invention quite satisfactorily. The intermediate areas of course are separated more than one or two wave lengths of light. Therefore the present invention requires the airspace (or other low index medium) to have a thickness greater than .00005 inch and since the separation of the picture and diffusing layers is equal to or greater than the airspace, this is the lower limit of the separation. Thus both the airspace and the separation of the picture and diffusing layers must be between .00005 inch and .005 inch preferably less than .001 inch.

The present invention is applicable to any photographic film having a transparent layer and a translucent layer and requiring an airspace between the two layers. Attention is drawn to the fact that the theory of the operation of this airspace as taught by Hanson and Evans requires that the bounding surfaces or at least the effective bounding surfaces thereof be flat and parallel, or at least approximately so. In the present invention, the airspace consists of a cellular layer such as a hardened foam layer containing cells which are flattened bubbles. The bubbles or dispersed phase in this hardened foam thus provide the required airspace, since on the average there is at each point of the layer at least one bubble or part of a bubble with parallel upper and lower surfaces. The degree to which the invention is effective depends on the percentage of bubbles which are so arranged. The continuous phase of the foam forms solid transparent membrane walls for the bubbles. The material of this continuous phase may be any transparent plastic such as a resin or a dispersed colloid or rubber, and the bubbles may be of any gas such as air or vapor but the structure of the layer must of course be strong enough not to collapse completely.

The foam is first made in liquid form and coated on the support (film base in the case of antihalation films and paper or light diffusing film in the case of color prints). In one embodiment the plastic or other material is dissolved in a suitable solvent or vehicle, made into a foam by suitable stirring with air and then hardened by drying by evaporation of the solvent. A similar procedure is employed with rubber dissolved in an oil solvent and made into a foam; in this case sulfur may be added to permit vulcanization of the rubber.

Another form of the invention uses colloids or plastics which are coated at a temperature at which they are liquid, the hardening being provided by cooling.

In any of the forms of the invention the bubbles should have a diameter of the same order magnitude as the thickness of the foam layer. That is, they cannot be very minute bubbles or they will diffuse the light and on the other hand they cannot be many times wider than the layer is thick or they will not provide sufficient support between the translucent and transparent films. In some cases the bubbles retain their normal globular shape as the continuous phase is hardened and in this case the layer must be subjected to pressure to flatten the bubbles. In other cases however the hardening of the layer and the flattening of the bubbles takes place at the same time. For example, a foam in which the bubbles are relatively highly dispersed may have the walls of the bubbles so thin when it is first coated that the foam partially collapses as the continuous phase hardens. This collapse usually is predominantly in a lateral direction between adjoining bubbles making a larger flatter bubble. Even perfectly round bubbles or perfectly elongated bubbles become flattened or spheroidal as the layer collapses and as hardening of the continuous phase takes place. It is essential that on the average the bubbles become wider than they are thick since this insures that the upper and lower surfaces of each bubble are relatively flat, although theoretically a properly oriented cubical bubble would be satisfactory.

The maximum total thickness of the foam layer is defined above as .005, preferably .001, inch and any individual bubble whose thickness is less than .00005 inch is ineffective as far as the present invention is concerned.

The invention and its advantages will be fully understood from the following description when read in connection with the accompanying drawing, in which:

Figs. 1 and 2 illustrate the purpose of an airspace support, Fig. 1 being a color print and Fig. 2 being an antihalation film in cross section in both cases;

Fig. 3 similarly illustrates the present invention;

Figs. 4, 5, and 6 illustrate various embodiments thereof;

Fig. 7 illustrates one method of producing a film according to the invention;

Fig. 8 is a diagrammatic illustration of the operation of another method according to the invention.

In Fig. 1 a color print is illustrated made up of a multi-color layer 10 separated by an airspace 11 from a light diffusing support 12 which may be paper or film with a white pigment therein, the diffusion being represented by an interface 13 in this layer. The actual diffusion may be from the surface of the layer 12 or the layer may consist of two parts, for example, paper with an overcoating of transparent material. In any case, a light ray 14 passes through the layer 10 and is diffused at the point 16. Any part of that diffused light which reaches the layer 10 again directly must, due to the operation of the airspace 11, pass out through the layer 10 as indicated by the ray 17. This is the normal harmless operation of the light. Other light scattered at the point 16 as illustrated by the ray 18 may be diffused at the point 19 along with a ray 20 also striking this point. The ray 21 thus reaching the eye 22 is made up mainly from light from the ray 20 plus a small percentage of light represented by the ray 18. However, due to the operation of the airspace 11 the ray 18 is colored only by one trip through the layer 10 represented by the section 15 of the ray 14. The airspace 11 prevents the ray 18 from multiple internal reflections within the colored layer 10. If the airspace were not present according to the invention of Hanson and Evans, each ray such as 21 would be diluted by rays such as 18 except that they would have traversed the color layer many times and very obliquely so that they have become highly colored. Thus the layer 10 is a transparent layer, at least its light scattering power, if any, is so small as to be negligible as far as the present invention is concerned and the layer 12 is a translucent one or at least a light diffusing one.

In Fig. 2 a sensitive emulsion 25 which is, of course, a translucent layer is separated by an airspace 26 from a transparent support 27. The purpose of the airspace in this case is to prevent halation. A light ray 28 is diffused somewhere in the emulsion layer 24, say at the point 29, so that one ray 30 is totally and internally reflected within the layer 25. However, this ray 30 does not travel far from home, and hence, does not cause a large spot of the type known as halation spots. Halation usually occurs when such rays as indicated by the dotted line 32 travel directly through to the base of the film and are totally and internally reflected back to the emulsion layer. On the other hand, another part of the scattered light as represented by the rays 31 is not totally and internally reflected but escapes into the airspace 26 and then enters the base layer 27 and eventually passes through into the air. Due to the airspace 26 every ray which enters the layer 27 passes on through without total internal reflection.

The embodiment of the invention shown in Fig. 3 consists of two layers 35 and 36, one of which is transparent and the other of which is light diffusing, separated by a hardened foam layer 37 made up of flattened bubbles 39 and a continuous solid phase 38 such as a resin, a rubber or other plastic. Under practically every point of the layer 35 is, at least, one bubble whose upper and lower surfaces are approximately parallel. Thus, the airspace required in Figs. 1 and 2 is provided.

In Fig. 4 a sensitive emulsion layer 41 is carried on a transparent support 42 by such a hardened foam layer 43. In Fig. 5 a transparent multi-colored picture 44 is carried on a translucent paper base 45 by a hardened foam layer 46. Fig. 6 differs from Fig. 5 only by the inclusion of additional transparent layers 47 and 48 whose purpose is to facilitate manufacturing. The paper base 45 is coated with the transparent layer 48 since it is not easy to coat a foam layer directly onto paper and have the bubbles thereof flattened. Similarly, the foam layer 46 is overcoated with a thin pellicle 47 so that the support made up of layers 45, 46, 47 and 48 may be prepared separately and used in the normal manner when coating a color sensitive layer or color picture layer 44 thereon.

In Fig. 7 one method of preparing the support is shown in which a support sheet 50 such as paper or film base passes around a roller 51 and through a foamy solution 52 so that a foam layer 55 is coated onto surface of the support 50. The foam is provided from a container 53 in which a resin is agitated and made foamy by a motor driven stirring device 54. As indicated by loops 56 the foam layer 55 is hardened either by evaporation of the solvent therein or by cooling or by both to form a hardened foam layer 55'. The combination of the supporting sheet and this foam layer is then passed between pressure rollers 60 having just sufficient pressure to flatten the layer 55' without collapsing it entirely, to form a hardened foam layer containing flatttened bubble cells indicated at 55''.

In Fig. 8 which is essentially a flow-chart, sections A, B, C, and D indicate successive stages in the hardening and flattening operations which in many cases are sufficient without additional flattening by pressure as indicated by Fig. 7. The support 60 is first coated with a liquid foam 61 in which the bubbles are substantially globular and relatively of small size. As this foam layer stands, the foam collapses as shown by the enlarged bubbles 62, the bubbles joining together. However, the collapse of the bubbles and the hardening of the continuous face is accompanied by a general shrinking of thickness in the layer. This encourages lateral collapse of the bubbles one into the other as shown by 63 and also the flattening of those which remain spheroidal. As the hardening continues as shown in section D of this Fig. 8, the bubbles become substantially flattened as shown at 64, at least sufficiently so to provide the airspace effect discussed above. As shown in Fig. 7 it is sometimes necessary to apply pressure as shown by the roller 60 to accompany this last flattening of the bubbles which constitutes the changeover from section C to section D of Fig. 8.

Having thus described various methods by which the present invention may be performed and produced, I wish to point out that it is not limited to these methods and their resulting structures, but is of the scope of the appended claims.

What I claim and desire to secure by Letters Patent of the United States is:

1. A photographic film comprising a transparent layer, a light diffusing layer and between the two layers, a cellular layer containing a large number of flattened bubble cells per square inch, the separation of the transparent and diffusing layers being between .00005 inch and .005 inch and there being, at practically every point of the area of the cellular layer, at least one cell whose thickness is also between .00005 inch and .005 inch.

2. A film according to claim 1 in which the transparent layer is the base and the light diffusing layer is a sensitive emulsion layer whereby the cellular layer acts to reduce halation arising from scattering of light in the emulsion and reflection from the rear surface of the base.

3. A film according to claim 1 in which the transparent layer contains a multicolored picture and the light diffusing layer is a diffusing support for the picture whereby the cellular layer acts to reduce highlight stain arising from internal reflections within the picture layer.

4. A thin supporting layer for a multicolor picture comprising a diffusing base, a transparent pellicle and between the base and the pellicle, a hardened foam layer containing flattened bubble cells, the total thickness of the pellicle and the foam layer being between .00005 and .005 inch and there being, at practically every point of the area of the foam layer, at least one cell whose thickness is also between .00005 and .005 inch.

5. A thin supporting layer for a multicolor picture comprising a diffusing base, a transparent pellicle and between the base and the pellicle, a hardened foam layer of flattened gas filled bubbles with solid transparent membrane walls, the total thickness of the pellicle and the foam layer being between .00005 and .005 inch and there being, at practically every point of the area of the foam layer, at least one cell whose thickness is also between .00005 and .005 inch.

6. A thin supporting layer for a multicolor picture comprising a diffusing base, a transparent pellicle and between the base and the pellicle, a hardened foam layer of flattened gas filled bubbles with transparent plastic membrane walls, the total thickness of the pellicle and the foam layer being between .00005 and .005 inch and there being, at practically every point of the area of the foam layer, at least one cell whose thickness is also between .00005 and .005 inch.

COURTNEY Q. GLASSEY.

REFERENCES CITED

The following references are of record in the file of this patent:

UNITED STATES PATENTS

| Number | Name | Date |
|---|---|---|
| 2,402,176 | Marks | June 18, 1946 |